United States Patent [19]

Miyawaki et al.

[11] Patent Number: 5,708,486
[45] Date of Patent: Jan. 13, 1998

[54] LCD HAVING A SHADING LAYER EXHIBITING A DIFFERENT REFLECTION CHARACTERISTIC FROM REFLECTION ELECTRODES

[75] Inventors: Mamoru Miyawaki, Isehara; Saburo Sugawara, Kawasaki, both of Japan

[73] Assignee: Canon Kabushiki Kaisha, Tokyo, Japan

[21] Appl. No.: 714,436

[22] Filed: Sep. 16, 1996

[30] Foreign Application Priority Data

Sep. 14, 1995 [JP] Japan .................................. 7-236857
Sep. 12, 1996 [JP] Japan .................................. 8-241937

[51] Int. Cl.⁶ .......................... G02F 1/136; G02F 1/1333; G02F 1/1335
[52] U.S. Cl. ............................ 341/44; 349/111; 349/113
[58] Field of Search .............................. 349/110, 111, 349/113, 44

[56] References Cited

U.S. PATENT DOCUMENTS

| | | | |
|---|---|---|---|
| 4,948,231 | 8/1990 | Aoki et al. | 349/44 |
| 5,130,829 | 7/1992 | Shannon | 349/111 |
| 5,317,433 | 5/1994 | Miyawaki et al. | 349/42 |
| 5,327,001 | 7/1994 | Wakai et al. | 349/110 |
| 5,365,357 | 11/1994 | Ohgawara et al. | 349/111 |
| 5,412,494 | 5/1995 | Ishiwata et al. | 349/110 |
| 5,513,028 | 4/1996 | Sono et al. | 349/139 |
| 5,530,266 | 6/1996 | Yonehara et al. | 257/72 |

FOREIGN PATENT DOCUMENTS

| | | |
|---|---|---|
| 0552492 | 7/1993 | European Pat. Off. . |
| 0617310 | 9/1994 | European Pat. Off. . |
| 03142417 | 6/1991 | Japan . |
| 07120744 | 5/1995 | Japan . |
| 07281207 | 10/1995 | Japan . |

*Primary Examiner*—William L. Sikes
*Assistant Examiner*—Toan Ton
*Attorney, Agent, or Firm*—Fitzpatrick, Cella, Harper & Scinto

[57] ABSTRACT

A display unit comprises a first substrate having a display area including a plurality of reflection electrodes with a gap portion formed therebetween and a peripheral portion around the display area, a second substrate opposing the first substrate and having a transparent electrode, and a liquid crystal material being put between the first and second substrates. The first substrate has a shading layer at at least part of the gap portion and the peripheral portion. The shading layer exhibits a different reflection characteristic from the reflection electrodes.

14 Claims, 8 Drawing Sheets

LCD HAVING A SHADING LAYER EXHIBITING A DIFFERENT REFLECTION CHARACTERISTIC FROM REFLECTION ELECTRODES

BACKGROUND OF THE INVENTION

1. Field of the Invention

The present invention relates to an apparatus for displaying images and characters, and more particularly, a display unit using a liquid crystal panel.

2. Related Background Art

Recently, since the multimedia age comes, it is desired to develop display units as man-machine-interfaces for realizing simple and sensuous reception and transmission of image information. Among them, liquid crystal display units get much attention due to their thinness, small power consumption, and high resolution.

Presently, liquid crystal display units are mainly used for note-type personal computers of 10-inch size. Their main stream is transmission types. Because these can realize high contrast display in simple structure. However, since their numerical apertures are small, that is, 30–50%, backlighting power is necessary. Hence, their essential property, small power consumption, is lost. On the other hand, since reflection-type units can use bright external light as illumination light, technical potential of them is higher than that of the transmission types because power for illumination light and the like are not necessary.

However, actually, reflection types are not sufficiently practiced. In the case of reflection types, reflection light irrelative to display signals except signal light from reflection electrodes enters into user's eyes from every direction. Therefore, it is difficult to perform high contrast display. In addition, in transmission types, unnecessary light does not enter to user's eyes since it is obstructed by shading layers and the like.

SUMMARY OF THE INVENTION

Then, the purpose of the present invention is to remove a reflection light component irrelative to display signals, which becomes noises, and to perform high contrast display so as to practice a reflection type of display unit.

In order to solve above problems, present inventors' serious endeavor results in the following invention. Thus, the display unit of the present invention comprises a first substrate having a display area including a plurality of reflection electrodes with a gap portion formed therebetween and a peripheral portion around the display area, a second substrate opposing the first substrate and having a transparent electrode, and a liquid crystal material being put between the first and second substrates. The first substrate has a shading layer at at least part of the gap portion and the peripheral portion, and the shading layer exhibits a different reflection characteristic from the reflection electrodes.

In order to realize the different reflection characteristic, when the reflection electrodes reflect illumination light, a shading layer may preferably reflect the illumination light to a direction different from the direction where the reflection electrodes mainly reflect the illumination light. It is desirable for the shading layer to have a different surface angle from the reflection electrodes. In this event, let the angle between the surfaces of the reflection electrodes and the surface of the shading layer be θ, the refractive index of the liquid crystal material be n, and the F-number to be F, and then, it is desirable for the angle θ to satisfy one of the following inequalities:

$$\frac{\tan^{-1}\left(\frac{1}{2F}\right)}{n} < \theta < 45° - \frac{\tan^{-1}\left(\frac{1}{2F}\right)}{2n}$$

$$45° + \frac{\tan^{-1}\left(\frac{1}{2F}\right)}{2n} < \theta < 60° - \frac{\tan^{-1}\left(\frac{1}{2F}\right)}{3n}$$

$$60° + \frac{\tan^{-1}\left(\frac{1}{2F}\right)}{3n} < \theta < 67.5° - \frac{\tan^{-1}\left(\frac{1}{2F}\right)}{4n}$$

$$67.5° + \frac{\tan^{-1}\left(\frac{1}{2F}\right)}{4n} < \theta < 72° - \frac{\tan^{-1}\left(\frac{1}{2F}\right)}{5n}$$

$$72° + \frac{\tan^{-1}\left(\frac{1}{2F}\right)}{5n} < \theta < 90°$$

Among above inequalities, it is preferable for θ to be between 10° and 30°. This structure can be formed by having a thick isolation layer under the reflection electrodes and a thin insulation layer at the gap portion between the reflection electrodes. It is also possible to form a holding capacitor with the reflection electrodes, the shading layer under the reflection electrodes, and the insulation layer between the reflection electrodes and the shading layer. It is also possible to form the structure according to the present invention when the gap space between a plurality of wiring layers located in the same plane as a signal line is wider under the gap portion between the reflection electrodes than under the reflection electrodes. The edges of the reflection electrodes adjoining each other are asymmetric to the pixel boundary plane between the reflection electrodes. It is more effective that the angles of the reflection electrodes are different from that of the transparent electrode of the second substrate. It is recommended that a first substrate is an active matrix substrate having a plurality of scanning lines, a plurality of signal lines, and a plurality of pixel switches located at intersections of the scanning lines and signal lines.

The difference in reflection characteristic between the reflection electrodes and the shading layer may also be realized by differenciating the materials of them without differentiating the directions of reflected light. In this event, it is desired that the material of the reflection electrodes is primarily aluminum (Al) and the material of the shading layer is primarily selected from titanium (Ti), titanium nitride (TIN), tungsten (W) and molybdenum (Mo). The above statement that "the material of the reflection electrodes is primarily aluminum" means that the material includes Al, AlSi, AlSiCu, AlCu, AlGe or AlGeCu.

Reflectance of the reflection electrodes should preferably be 80% or higher, more preferably 90% or higher. Such a high reflectance can be attained by mirror polishing an aluminum surface by means of the CMP (chemical mechanical polishing) technique. On the other hand, reflectance of the shading layer should preferably be 70% or lower, more preferably 60% or lower, optimally 40% or lower. The material of the shading layer should preferably be Ti, if the prevention of leakage of the holding capacity formed by the reflection electrodes and the shading layer is taken into consideration, and the reflectance at film formation of Ti is about 58%. Preferably, by using TiN, the surface reflectance can be lowered to about 30%. As compared to the case that the reflection electrodes and the shading layer have generally the same reflectance, the contrast shall be improved by at least 10%, i.e. when the reflectances of the reflection electrodes and the shading layer are 80% and 70%, respectively. When the reflectance of reflection electrodes is 90%, if the reflectance of the shading layer is 60% or 40%, then the contrast shall be improved by 30% or 50%, respectively.

Reflection characteristic can also be differentiated by differentiating the surface roughness of the reflection electrodes and the shading layer, whereby such a high contrast can be attained. Surface roughness of the reflection electrodes is, if evaluated as peak to valley, preferably 1000 Å or less, more preferably 500 Å or less. On the other hand, surface roughness of the shading layer is preferably 1500Å or more, more preferably 2000 Å or more. When the surface roughnesses of the reflection electrodes and the shading layer are 500 Å or less and 1500 Å or more, respectively, the contrast shall be improved by 25% or more as compared to the case of both being generally the same surface roughness, by cutting off noise components of reflected and scattered illumination light by means of an aperture. Such a small surface roughness as 1000 Å or less for the reflection electrodes can be obtained by forming an underlying insulation layer with a smooth surface and then forming thereon an Al-based film by sputtering under high vacuum. Further, a surface roughness of 500 Å or less can be obtained by further polishing the surface by means of the CMP treatment followed by washing out the slurry deposited on the surface. On the other hand, such a large surface roughness as 1500 Å or more for the shading layer can be obtained by forming e.g. a W film by means of the CVD technique. Still larger surface roughness can be obtained controllably by increasing the film thickness of the shading layer.

According to the present invention, since a shading layer is provided at at least part of the gap portion and the peripheral portion and the shading layer exhibits a different reflection characteristic from the reflection electrodes, noise light does not enter into user's eyes from the gap portion or the peripheral portion. For this reason, a user can see image display with high contrast.

DETAILED DESCRIPTION OF THE PREFERRED EMBODIMENTS

Hereafter, embodiments according to the present invention will be described by exemplifying four liquid crystal panels. However, the present invention is not limited to each of embodiments. It is apparent that combination of techniques in embodiments increases its effects. In addition, structures of liquid crystal panels are described as panels using semiconductor substrates. However, each of the substrates is not always limited to the semiconductor substrate, but it is possible to form a below-described structure on a usual transparent substrate. Furthermore, below-described liquid crystal panels are only TFT-types, but MIM-types and simple matrix types can be used. Still more, each of the liquid crystal panels described below is effective as a display unit for a home TV set, projector, head-mount display unit, 3D video game machine, lap top computer, electronic notebook, TV conference system, car navigation system, and panels in an airplane.

Embodiment 1

In a first embodiment according to the present invention, a constricted portion of a field oxide film is formed at each gap between pixel reflection electrodes so as to be provided with a shading layer, having an angle different from that of a pixel reflection electrode, at the gap between pixel reflection electrodes, and a step of the shading layer is reflected in a shape of an upper layer, that is, a shading metal layer. Also, the peripheral portion around the pixel reflection electrodes is provided with a shading layer having a different angle. The pixel reflection electrode changes transmissivity of a liquid crystal material and modulates illumination light according to an input signal. The modulated reflected light is regularly reflected on a surface of the pixel reflection electrode, and reaches user's eyes. On the other hand, an angle of the shading layer at a gap between the pixel reflection electrodes or in the peripheral portion is different from that of the pixel reflection electrode. Hence, the regularly reflected light from the surface of the shading layer is reflected to a direction different from a direction of the reflected light modulated by the pixel reflection electrode, and therefore, the regularly reflected light does not reach user's eyes. For this reason, if the modulated signal is picked up through an optical system passing only regularly-reflected light from the pixel reflection electrode, the problem of a reflection-type liquid crystal panel can be resolved that its contrast is low.

Figure 1A:
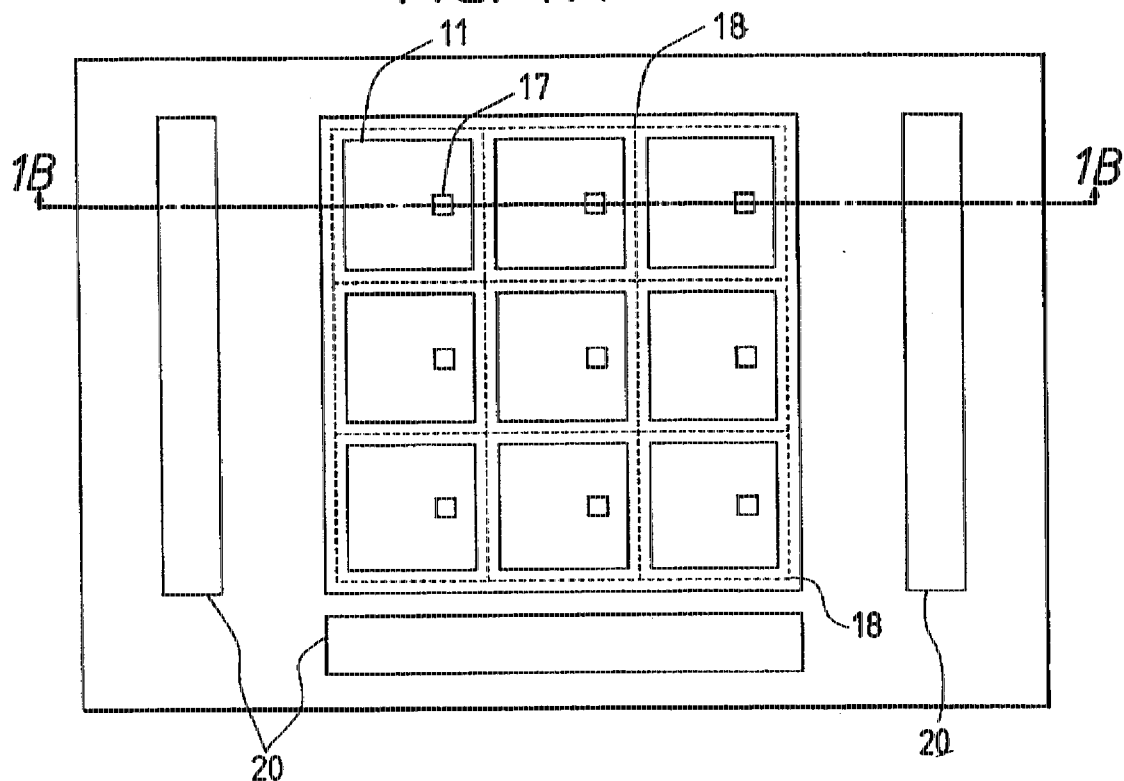
FIGS. 1A and 1B are drawings showing a first embodiment according to the present invention.
Figure 1B:
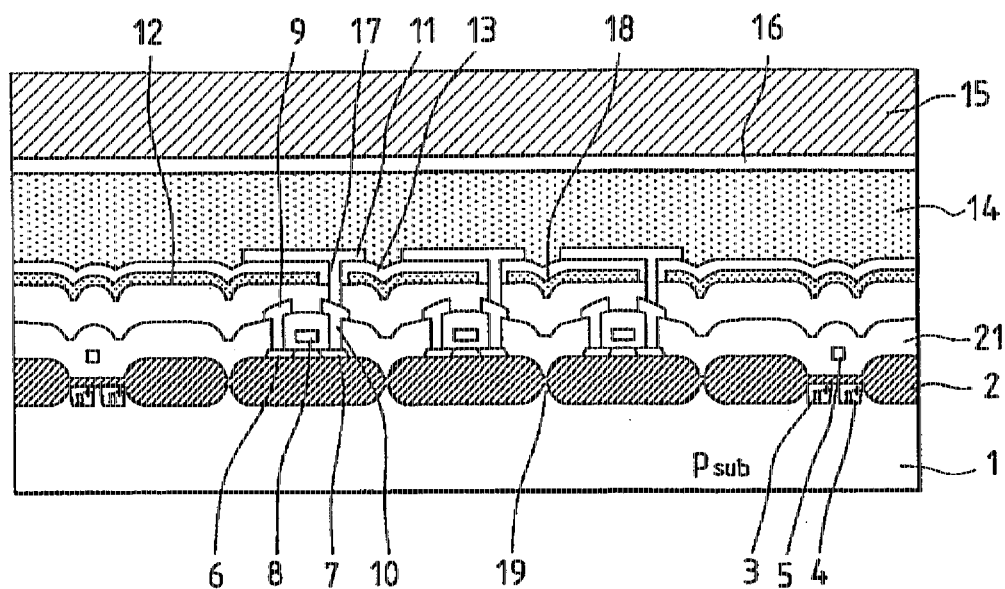

FIGS. 1A and 1B show a top view (1A) of a reflection type of TFT active matrix liquid crystal display panel according to a first embodiment and a cross-sectional view (1B) taken on line 1B—1B of FIG. 1A respectively. In the views, reference numeral 1 represents a semiconductor substrate, 2 does a field oxide film, and 3 to 5 do a source, drain, and gate of a MOSFET composing a peripheral circuit for driving the reflection type of TFT active matrix liquid crystal display panel. And, 6 to 8 represent a source, drain, and gate of a thin-film-transistor being a pixel switch in a display area, 9 does a data line, 10 does a metal electrode, 11 does a pixel reflection electrode, 12 does a shading metal layer, and 13 does an insulation layer. Furthermore, 14 represents a liquid crystal material, 15 does an opposing transparent electrode, 16 does a common transparent electrode, 17 does a through-hole, 18 does a boundary area of each pixel, 19 does a constricted portion of the field oxide film, and 20 does driving circuits around the display area.

In FIG. 1B, the semiconductor substrate 1 is a p-type semiconductor substrate, and MOSFETs composing peripheral circuits for driving the panel are n-channel transistors. However, the substrate can be an n-type semiconductor substrate, and the MOSFETs can be p-channel transistors. It is desirable for low power consumption characteristics that CMOSs incorporating p-channel MOSFETs compose the driving circuits 20 around the display area. In this time, the driving circuits can be configured as circuits comprising not only CMOSs, but also npn and pnp transistors. Furthermore, a video circuit can be incorporated in the liquid crystal driving circuit. In the thin-film transistor 6, 7, and 8, its source 6 is connected to a signal line 9 vertically located, its drain 7 is to a pixel reflection electrode 11 through a metal electrode 10 formed in the through-hole 17, and its gate 8 is to a driving line horizontally located. Since, under the pixel reflection electrode 11, there is the shading metal layer 12 having the same potential as that of the common transparent electrode 16, a holding capacitor is formed by putting the insulation layer 13 between the pixel reflection electrode 11 and shading metal layer 12. In this time, since capacitance of the holding capacitor becomes large if a material having the high dielectric constant is used as the insulation layer 13, effect of holding a video signal becomes large. For this reason, suitable materials for the insulation layer 13 are SiON, SiN, $Ta_2O_5$, BST, and the like besides $SiO_2$ usually used. In addition, it is recommended to be provided with Ti, TiN, and TiW, capable of preventing a hillock, under the pixel reflection electrode 11 and on the shading metal layer 12. It is desirable to make a surface of the pixel reflection electrode 11 flat with a chemical mechanical polishing method. As a liquid crystal material 14, it is possible to use a guest-host type, deflection type like FLC, or dispersion type like macromolecular dispersion type liquid crystal. The common transparent electrode 16 is formed on the surface of the transparent substrate 15 facing to the liquid crystal material.

The field oxide film 2 having the constriction portion is formed on the semiconductor substrate 1 using the local oxidation of silicon (LOCOS) method. Next, TFTs are formed on the thick portion of the field oxide film 2 using well-known processing, and the insulation layer isolating each TFT 21 is formed. This insulation layer keeps the shape of the constriction portion of the field oxide film 2. Subsequently, since the shading metal layer 12 is stacked on the insulation layer keeping the shape of the constriction, the shading metal layer 12, as shown in FIG. 1B, keeps the shape of the constriction at the gap between pixel reflection electrodes 11.

Figure 7:
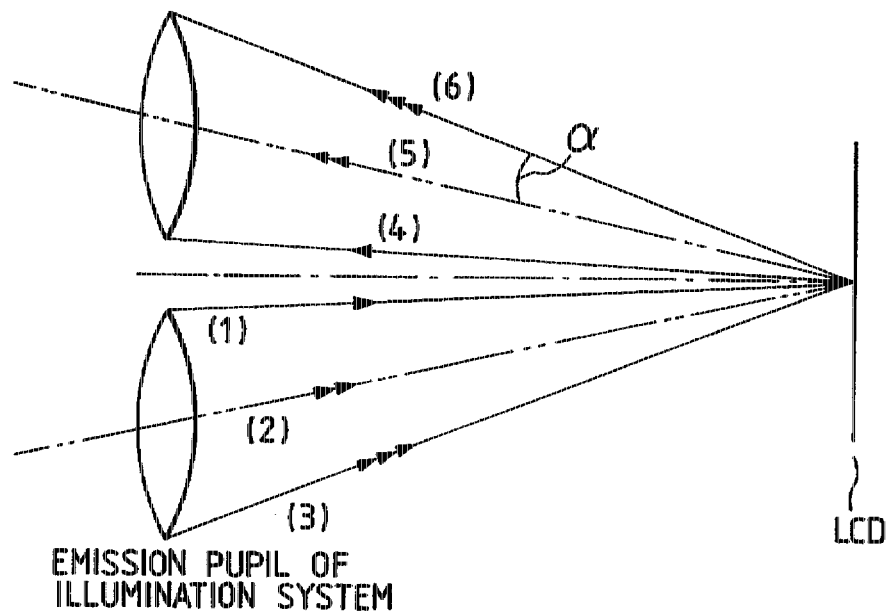
FIG. 7 is a drawing of light paths showing that light emitted from an illumination light system is reflected.

Next, it will be described what should be done so as to prevent incidence of noise light, which occurs by incident light being reflected by the shading metal layer 12 at a gap, into an optical projection system. FIG. 7 shows the situation that light emitted from an illumination system is modulated with images in the liquid crystal panel (LCD) and is reflected to enter the optical projection system. If an emission pupil of the illumination system and incident pupil of the optical projection system are conjugate optical systems, all of the light reflected from reflection surfaces on the pixel reflection electrodes of the liquid crystal panel among the light generated from the emission pupil of the illumination system enter into the optical projection system. The light reflected by the pixel reflection electrodes of the liquid crystal panel passes paths (1)→(4), (2)→(5), and (3)→(6). Then, the noise light emitted from the illumination system, and reflected at the gaps of the shading metal layer 12 should be always led to the outside of the incident pupil of the optical projection system. For example, in order that reflected light does not enter into the incident pupil of the optical projection system when the light (1) passing the end of the incident pupil is reflected once at a gap of the shading metal layer 12, it is essentially necessary for the light to proceed in inclining at the angle of 2α clockwise than that of the light (4) reflected by the pixel reflection electrode 12. Here, α can be expressed as $\alpha=\tan^{-1}(1/2F)$.

Figure 2A:
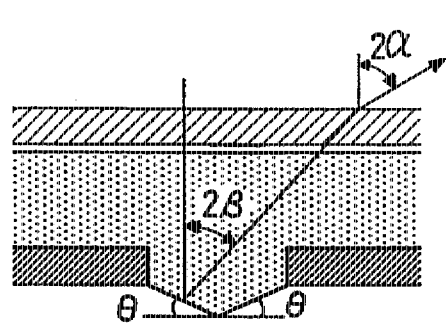
FIGS. 2A to 2E are drawings showing reflection of noise light at a gap between pixel reflection electrodes.
Figure 2B:
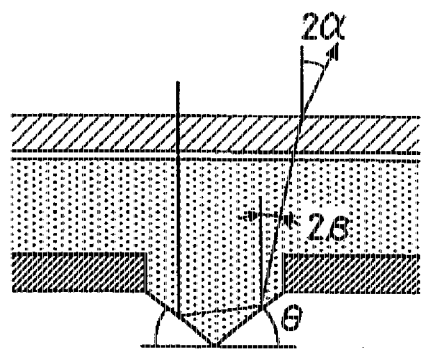
Figure 2C:
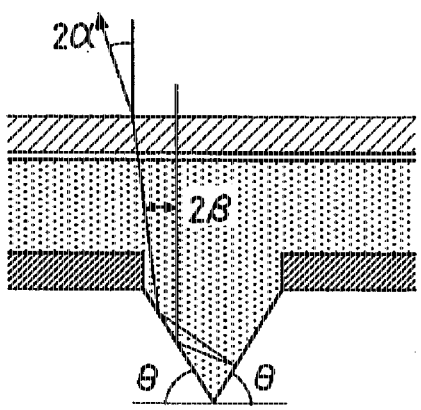
Figure 2D:
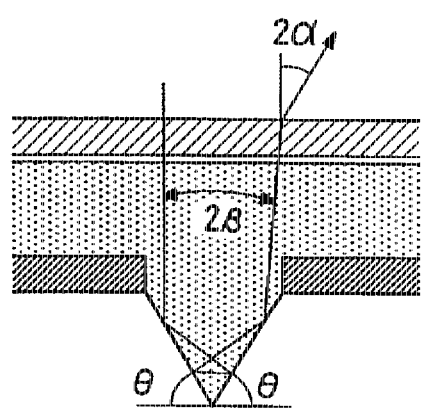
Figure 2E:
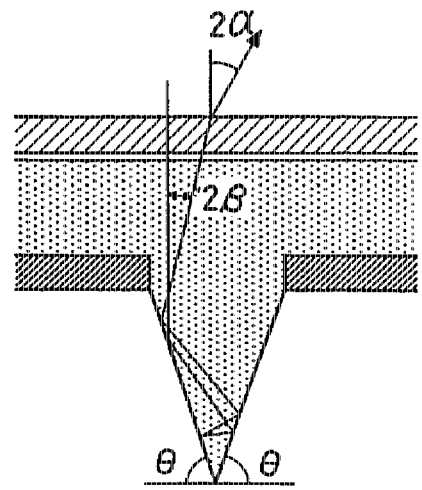

FIGS. 2A to 2E are drawings each of which shows a direction of reflected light corresponding to an angle of the shading metal layer 12 at a gap between the pixel reflection electrodes 11. FIG. 2A shows a direction of reflected light in a case that incident light enters perpendicularly to the liquid crystal panel and is projected after being reflected once by the shading metal layer 12. FIG. 2B shows a direction of reflected light in a case that the light is projected after being reflected two times. FIG. 2C shows a direction of reflected light in a case that the light is projected after being reflected three times. FIG. 2D shows a direction of reflected light in a case that the light is projected after being reflected four times. FIG. 2E shows a direction of reflected light in a case that the light is projected after being reflected five times. Here, first, the case of one-time reflection shown in FIG. 2A will be described. Let an angle between the shading metal layer 12 at a gap and the pixel reflection electrode 11 be θ. Since a direction of light reflected by the pixel reflection electrode 12 is nearly perpendicular to the liquid crystal panel, a direction of light reflected by the shading metal layer 12 at the gap and projected should have an angle bigger than or equal to 2α to a normal of the liquid crystal panel. Let a refractive index of the liquid crystal material be n, and an angle between the reflected light from the shading metal layer at the gap in the liquid crystal material and the normal be 2β, and then, 2β=2nα. In the case of one-time reflection, θ=β, and hence, θ>α/n={$\tan^{-1}(1/2F)$}/n. A refractive index n of the actual liquid crystal material is nearly 1.5, and Table 1 shows the result of substitution of 4, 2.8, and 2.0 for F.

TABLE 1

| F. No | α | θ |
|---|---|---|
| 4 | 7.125° | ≧4.75° |
| 2.8 | 10.125° | ≧6.75° |
| 2.0 | 14.036° | ≧9.357° |

For example, if the F-number of the optical projection system is 2.8, it is appropriate that θ is more than or equal to 6.75°.

However, if θ is excessively large, the light, as shown in FIG. 2B, is reflected two times by the shading metal layer 12 at the gap. If the light is reflected two times at the gap as shown in FIG. 2B, and assuming θ=45°±$θ_2$, then 2β=4nθ. In this time, in order that the noise light from the gap has an angle larger than or equal to 2α, θ can be except the range of 45°±$θ_2$ in Table 2 because 2β=2nα. Thus, it is recommended that θ is except the range of 45°±{$\tan^{-1}(1/2F)$}/(2n).

TABLE 2

| F. No | α | $θ_2$ |
|---|---|---|
| 4 | 7.125° | 2.375° |
| 2.8 | 10.125° | 3.375° |
| 2.0 | 14.036° | 4.679° |

In addition, in the case of three-time reflection as shown in FIG. 2C, let θ=60°±$θ_3$, and then, 2β=6nθ. In this time, θ can be except the range of 60°±$θ_3$ in Table 3. That is, it is recommended that θ is except the range of 60°±{$\tan^{-1}(1/2F)$}/(3n).

TABLE 3

| F. No | α | θ₃ |
|---|---|---|
| 4 | 7.125° | 1.583° |
| 2.8 | 10.125° | 2.25° |
| 2.0 | 14.036° | 3.119° |

More over, in the case of four-time reflection as shown in FIG. 2D, let $\theta=72°\pm\theta_4$, and then, $2\beta=8n\theta$. In this time, $\theta$ can be except the range of $72°\pm\theta_4$ in Table 4. Namely, it is recommended that $\theta$ is except the range of $67.5°\pm\{\tan^{-1}(\frac{1}{2}F)\}/(4n)$.

TABLE 4

| F. No | α | θ₄ |
|---|---|---|
| 4 | 7.125° | 1.188° |
| 2.8 | 10.125° | 1.688° |
| 2.0 | 14.036° | 2.339° |

Still more, in the case of five-time reflection as shown in FIG. 2E, let $\theta=72°\pm\theta_5$, and then, $2\beta=10n\theta$. In this time, $\theta$ can be except the range of $72°\pm\theta_5$ in Table 4. Namely, it is recommended that $\theta$ is except the range of $72°\pm\{\tan^{-1}(\frac{1}{2}F)\}/(5n)$.

TABLE 5

| F. No | α | θ₅ |
|---|---|---|
| 4 | 7.125° | 0.95° |
| 2.8 | 10.125° | 1.35° |
| 2.0 | 14.036° | 1.871° |

On account of above considerations, the followings are optimum as the angle θ of the shading metal layer at the gap between the pixel reflection electrodes 11:

$$\frac{\tan^{-1}\left(\frac{1}{2F}\right)}{n} < \theta < 45° - \frac{\tan^{-1}\left(\frac{1}{2F}\right)}{2n}$$

$$45° + \frac{\tan^{-1}\left(\frac{1}{2F}\right)}{2n} < \theta < 60° - \frac{\tan^{-1}\left(\frac{1}{2F}\right)}{3n}$$

$$60° + \frac{\tan^{-1}\left(\frac{1}{2F}\right)}{3n} < \theta < 67.5° - \frac{\tan^{-1}\left(\frac{1}{2F}\right)}{4n}$$

$$67.5° + \frac{\tan^{-1}\left(\frac{1}{2F}\right)}{4n} < \theta < 72° - \frac{\tan^{-1}\left(\frac{1}{2F}\right)}{5n}$$

$$72° + \frac{\tan^{-1}\left(\frac{1}{2F}\right)}{5n} < \theta < 90°$$

Figure 8:
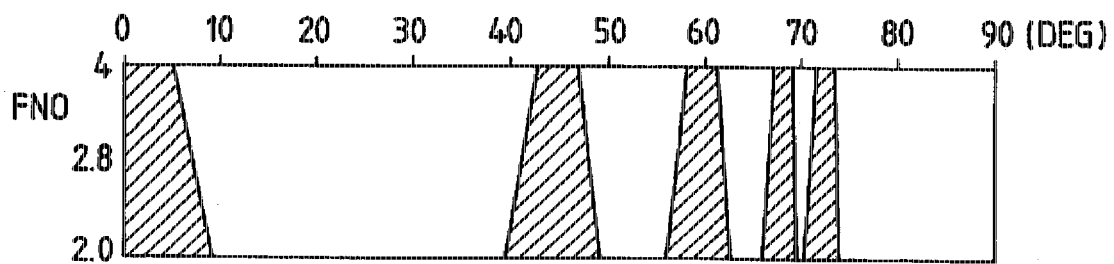
FIG. 8 is a graph showing angles that a shading metal layer between the pixel reflection electrodes can make.

FIG. 8 is a graph where adaptive angles θ of the shading metal layer 12 at a gap are applied by setting the F-number as the vertical axis, in consideration of the case that the emitted light from the illumination system is reflected a plurality of times by the shading metal layer 12 at the gap. Here, oblique lines represent angles that the shading metal layer 12 at the gap should not make, and blank areas represent possible areas. In addition, the reason why the area where the angle θ is near to 90° is determined to be a possible area is that the noise light does not substantially go to the outside if a frequency of reflection is large. Furthermore, so as to make a value of θ have a little margin, it is desirable for θ to be 10° to 30°.

Embodiment 2

In a second embodiment according to the present invention, so as to be provided with a shading layer, having an angle different from that of a pixel reflection electrode, at a gap between pixel reflection electrodes, using a wiring layer, a step is formed at the gap of each pixel reflection electrode and the step is reflected in a shape of an upper layer, that is, the shading metal layer. Thus, at the gap of each pixel reflection electrode, a wiring layer is not formed, and, under each pixel reflection electrode, dummy wiring is formed, the wiring which does not function as usual wiring but realizes planarity. This utilizes the characteristics that, if a space between lines is narrower than the desired one, an interlayer insulation layer is flat, and, if wider, a step occurs.

Figure 3:
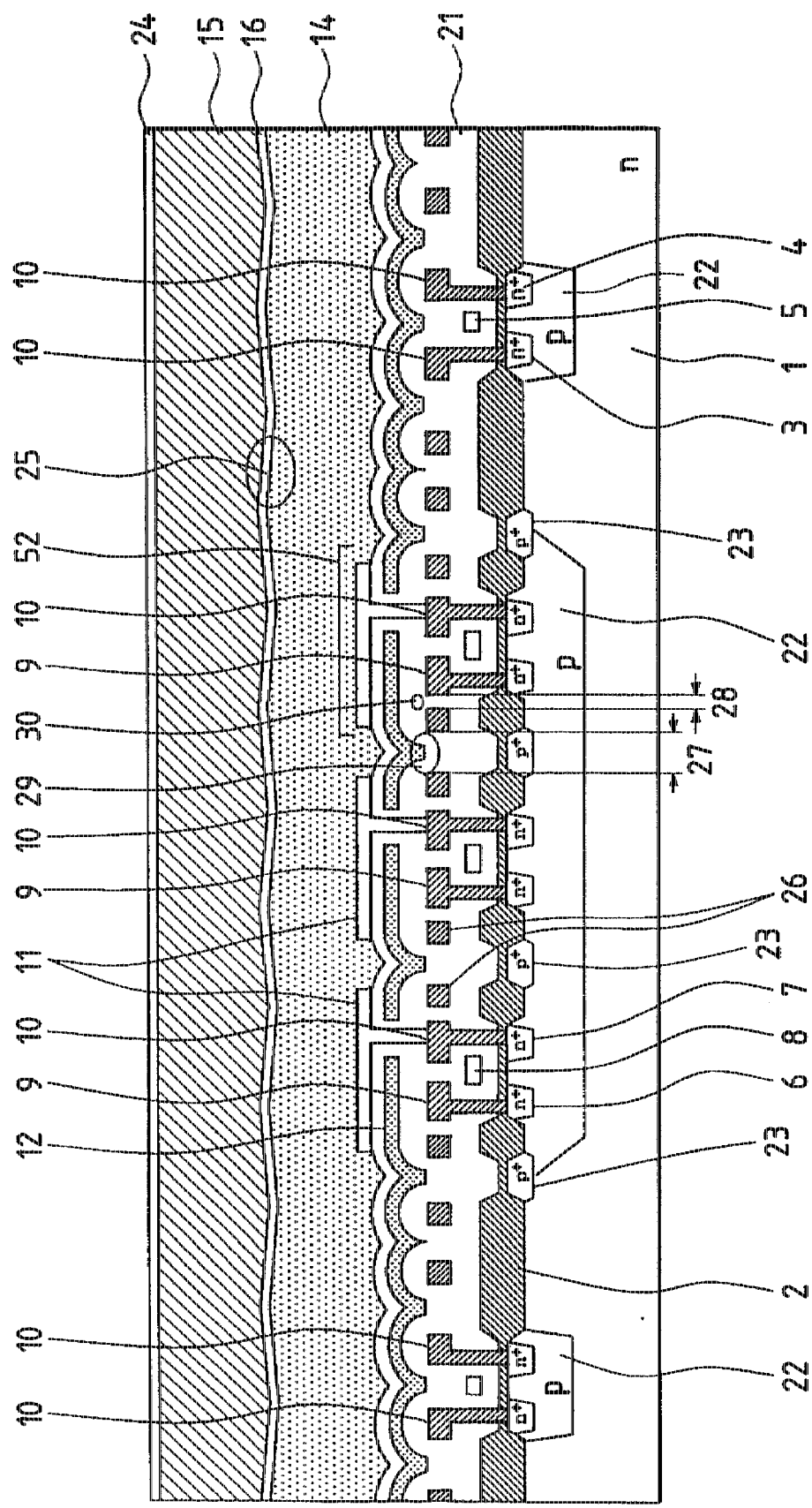
FIG. 3 is a drawing showing a second embodiment according to the present invention.

FIG. 3 shows a cross-sectional view of a reflection type of TFT active matrix liquid crystal display panel according to embodiment 2. Reference numeral 22 represents a well region, 23 does a heavily-doped impurity layer for well potential fixing, 24 does an antireflection layer, 26 does dummy wiring, 27 does a wide gap of wiring, and 28 does a narrow gap of the wiring. Description of the same parts as those in FIGS. 1A and 1B will be omitted.

Both an n-type semiconductor substrate, as shown in FIG. 3, and an p-type substrate can be used as a semiconductor substrate. The well region 22 is the reverse conductive type to the semiconductor substrate 1. Although FIG. 3 shows that a peripheral circuit 3, 4, and 5 and a pixel switch 6, 7, and 8 are composed of n-channel MOSs, it is desirable for the peripheral circuits including a scanning circuit to be composed of CMOSs, and for the pixel switch to be composed of a transmission gate comprising n-channel and p-channel MOSFETs. Although the heavily doped impurity layer 23 for well potential fixing is $p^+$ in FIG. 3, $n^+$ can be used. In order to prevent the reflected noise light from being projected to the same direction, an opposing transparent substrate 15 and a common transparent electrode 16 are formed in wavy figures like numeral 25 in FIG. 3 in order that angles of their surfaces are different from those of the pixel reflection electrodes 11. Although the best wave period is two pixel-pitches, a plurality of wave periods per pixel and a plurality of pixels per wave period are also much effective. Of course, it is apparent that a period between above periods is also effective. In addition, it is not necessary that the wave period is harmonized with the pixel pitch. Furthermore, although the angle of the surface of the waviness 25 is desirable to be 1° to 25°, if the F-number of the optical projection system is 2 to 4, it is more desirable for the angle to be 4° to 12°.

In the second embodiment, using the wiring layers 9, 10, and 26, a step is formed at a gap between pixel reflection electrodes 11, the surface angle of the shading metal layer 12 at the gap is made to be different from the angle of the pixel reflection electrode 11. In this time, as numeral 26 shown in FIG. 3, dummy wiring is formed, the wiring which does not function as usual wiring but realizes planarity. Thus, this utilizes the characteristics that, if a gap of wiring becomes narrow to a certain extent, an interlayer insulation layer 53 becomes flat, and, on the other hand, if wider, a step occurs in the interlayer insulation layer 53. The gap of the wiring to cause the step is desirable to be more than or equal to 1.5 μm. Desirable materials for these interlayer insulation layers are insulation layers stacked with film coating technology achieving good step coverage using the structure such as $SiO_2$ formed with plasma CVD, and three-layer structure composed of p-SiO/O₃-TEOS/p-SiO. Because, through applying the three-layer structure, it can be achieved to stabilize the interlayer insulation layer by preventing moisture absorption of TEOS. Therefore, as numerals 27 and 28 shown in FIG. 3, the gap of the wiring layer at the gap of the pixel reflection electrodes 11 is wider than that in other areas of the display area.

In addition, it is recommended to be provided with an area (dummy area) 52 having the same structure as above in a peripheral portion of the display area. Because, if the periodic structure is suddenly discontinued, diffracted reflected light enters from its boundary area. This dummy area 52 achieves to prevent the diffracted reflected light and to get high contrast. Furthermore, it is recommended to make the surface of the shading metal layer 12 wavy by leaving spaces between the wiring of the peripheral portion in the display area and the dummy wiring, similarly to the gap of the pixel reflection electrode 11 in the display area. Owing to this, since the reflected light from the peripheral portion proceeds to a direction different from a direction to which the reflected light from the pixel reflection electrode 11 proceeds, higher contrast can be achieved.

Since the second embodiment uses single-crystal MOS-FETs for the pixel switch, it can not only drive the pixel switch at high speed, but also increase stability, reliability, and yield.

Embodiment 3

In a third embodiment according to the present invention, waviness corresponding to the grain size of polysilicon is formed by being provided with a shading layer on the polysilicon so as to form the shading layer, having an angle different from that of a pixel reflection electrode, at a gap between the pixel reflection electrodes. Thus, light is dispersed by the waviness corresponding to the grain size, which can prevent noise light from entering into user's eyes.

Figure 4:
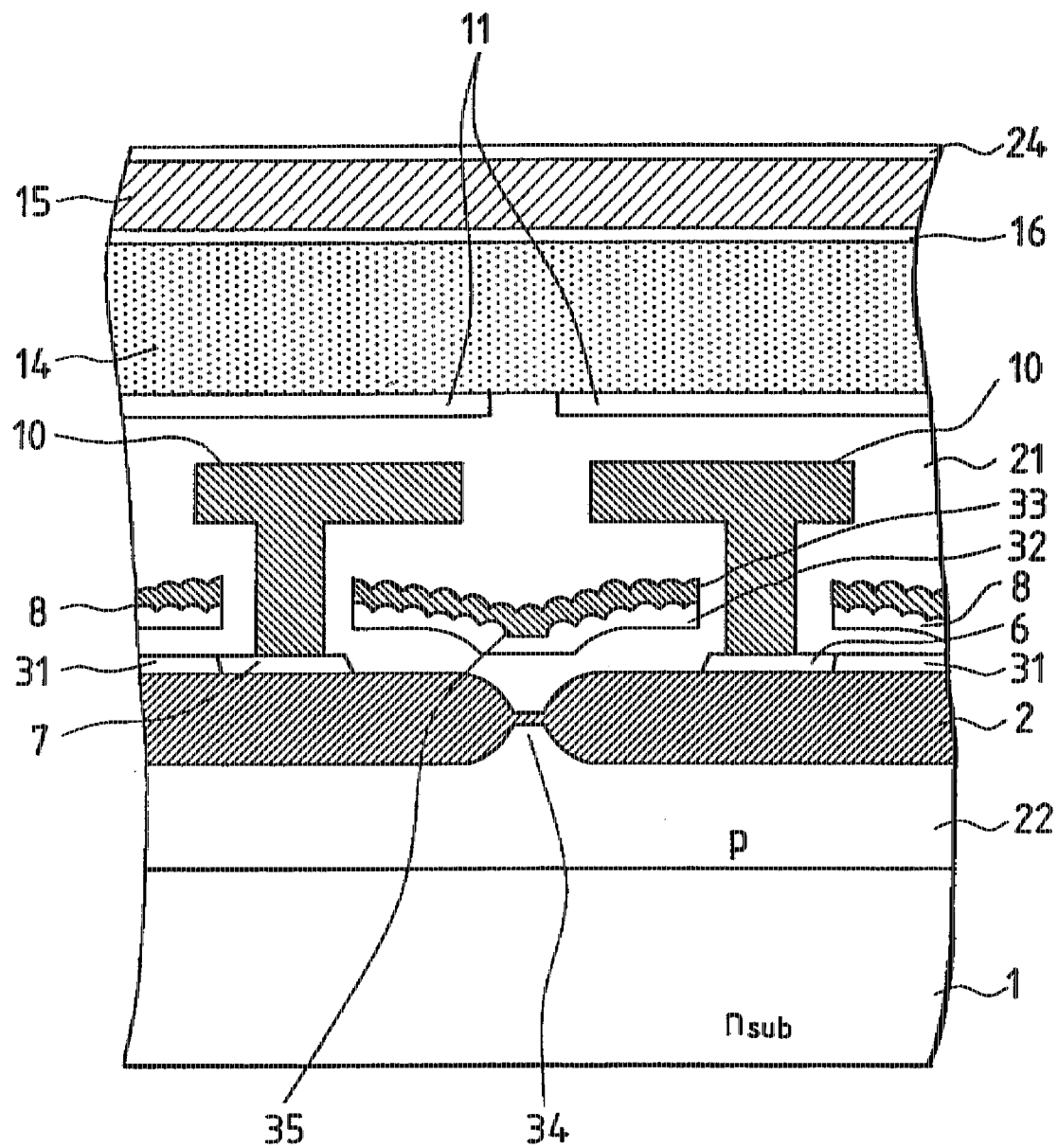
FIG. 4 is a drawing showing a third embodiment according to the present invention.

FIG. 4 is a drawing showing cross-sectional structure of pixels adjoining each other in the display area. In this drawing, numeral 31 represents a channel of a TFT for a pixel switch, 32 does polysilicon, and 33 does a light dispersion layer, having a step, at a gap between the pixel reflection electrodes. Description of the same parts in FIGS. 1A, 1B, and 3 will be omitted.

Although a semiconductor substrate and a well region are shown as an n-type and p-type respectively, their types can be exchanged each other. In addition, using the LOCOS method, an area having no field oxide film 2 can be formed at the boundary area 34 between pixels in the field oxide film. A gate portion 8 of a pixel switch has two-layer structure composed of a lower layer 32 of polysilicon, and an upper layer of tungsten silicide (WSi) or tungsten (W). In this time, the upper layer has waviness corresponding to the grain size of the polysilicon. This waviness is formed by performing oxidation processing and oxide removal with HF after coating the lower layer 32 of polysilicon. By coating W on this surface and performing thermal processing, the above structure can be realized. In this time, two-layer structure 77 composed of polysilicon and W as well as the gate portion 8 of the pixel switch is made under a gap between the pixel reflection electrodes 11.

The third embodiment performs light shading using a wiring layer 10 such as signal lines, a wiring layer 8 such as scanning lines, and the dummy wiring 33. Thus, portions that the wiring layer 10 cannot shade are shaded with the two-layer structure 8 and 33 composed of polysilicon and W below the wiring layer 10. Owing to this, the third embodiment can shade light going to a pixel switch not using the shading metal layer which was described in the first and second embodiments. Therefore, manufacturing cost can be reduced. In addition, since W is stacked on the wiring layer 32 and 33 of polysilicon, a reflection factor of light becomes small. Therefore, light shading effect becomes large, and further, it is advantageous for high-speed driving of a high-quality panel due to low resistance of the wiring layers 32 and 33.

Embodiment 4

A fourth embodiment according to the present invention makes an edge shape of a pixel reflection electrode different from that of an adjacent pixel reflection electrode so as to be provided with a shading layer at a gap between pixel reflection electrodes for preventing light entering into user's eyes from dispersing. Owing to this, it becomes possible to make the noise light proceed to a direction different from a direction from which the noise light enters to user's eyes, and hence, high contrast of the liquid crystal panel can be realized.

Figure 5:
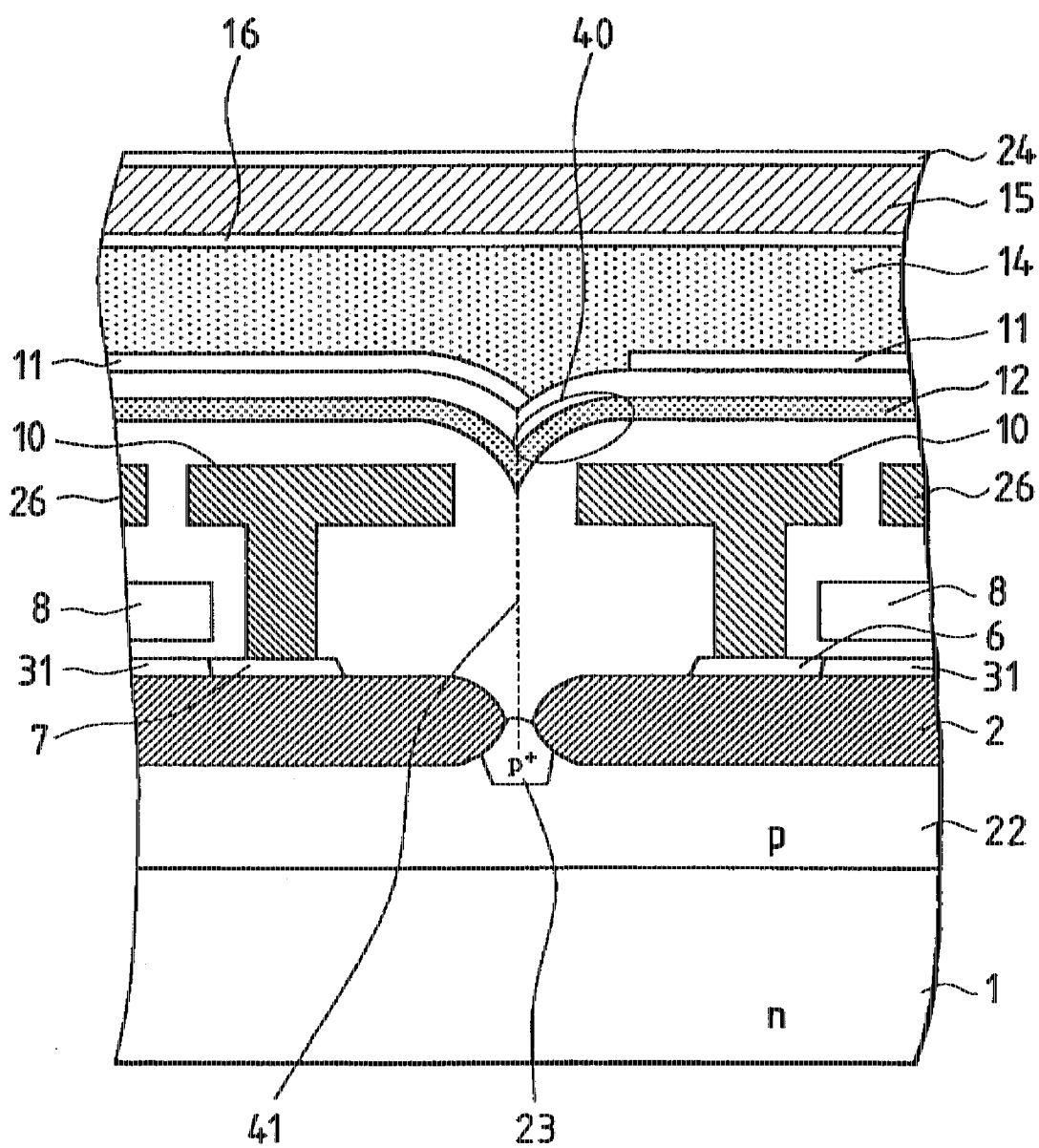
FIG. 5 is a drawing showing a fourth embodiment according to the present invention.

FIG. 5 is a drawing showing cross-sectional structure of adjacent pixels in a display area. In this drawing, numeral 40 represents a shading layer at a gap between the pixel reflection electrodes 11, and 41 does a just midpoint of a gap between the pixel reflection electrodes 11. Numerals that are the same as those in up to FIG. 4 will be omitted because they represent the same parts. In the fourth embodiment, positional relation between the pixel reflection electrodes 11 adjoining each other is made asymmetric against the central position 41 of an area having no field oxide film and an area having a wide gap of a wiring layer. Thus, light entered into a gap between the pixel reflection electrodes 11 is reflected to a direction from which the light does not enter into user's eyes by a portion 40 having an angle different from that of the main surface of the pixel reflection electrode 11 under the shading metal layer 12. For this reason, the light from the shading metal layer near to numeral 40 does not enter into user's eyes, and hence, high contrast can be realized.

Embodiment 5

Figure 9:
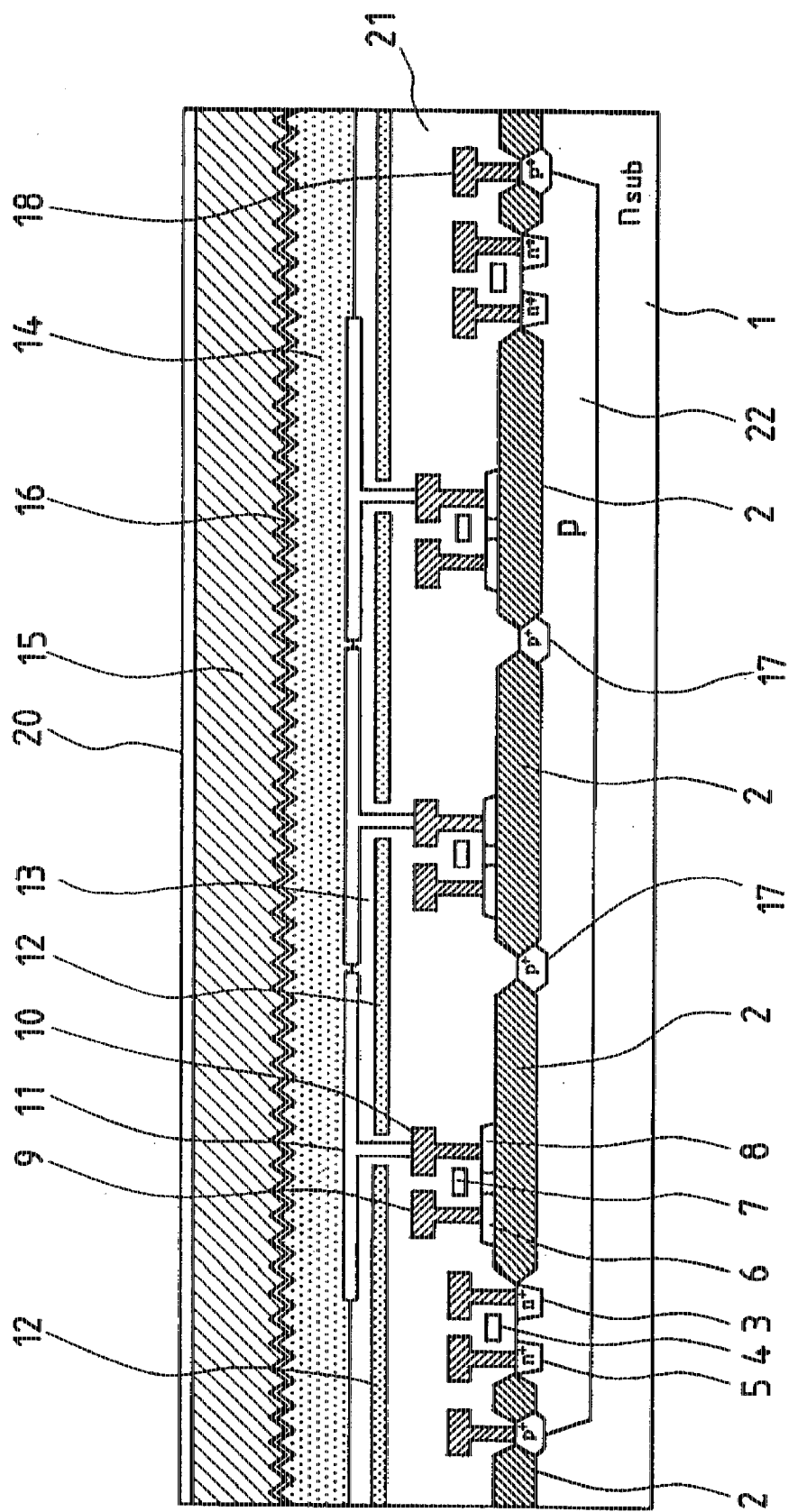
FIG. 9 is a drawing showing a cross section of a liquid crystal panel of a fifth embodiment according to the present invention.

In this embodiment, a shading layer is formed at the gap portion between pixel reflection electrodes as maintained in parallel with the pixel reflection electrodes, and the material of the shading layer is different from that of the reflection electrodes to differentiate the reflection characteristic. Further, a region having no field oxidation film (ATC region: usually an active region constituting a transistor) is partially provided within a display area, and a well region 22 or a heavily doped impurity region for fixing the substrate potential is provided there. FIG. 9 shows a cross section of a reflection type, TFT active matrix liquid crystal display panel according to the fifth embodiment. There are also provided a shading metal layer 6 for preventing irradiation of devices or circuit on a semiconductor substrate 1 with illumination light, an insulation layer 21 and a wiring 18 for connecting a power source. The same numerals as used above represent the same members. The potential of the semiconductor substrate 1 in the display area and the well region 22 is fixed to the source potential of the peripheral portion around the display area due to a heavily doped p-type impurity region 17 provided between the field oxidation films 2. Since the heavily doped impurity region 17 can be formed at the same time as $p^+$-regions such as p-channel MOS-FET 3, 4 and 5 in the peripheral driving circuit or source and drain regions of a p-channel thin film transistor 6, 7 and 8 in the display area, such a heavily doped region can be formed easily by a simple process. Accordingly, a panel can be manufactured at a low cost, while a heavily doped impurity region with a low resistance can be made to stabilize the substrate potential. When an AlSi (Si: 1%) film was formed as a pixel reflection electrode 11 by sputtering on a p-Si substrate, it exhibited a surface reflectance of 85%. Also, when a Ti film was formed as a shading layer in a similar manner, it exhibited a surface reflectance of 58%. The surface roughness of the Ti film was found as a maximum thickness variance of 190 Å in case of a total film thickness of 1750 Å. On the other hand, the surface reflectance of the AlSi film was increased to 95% or higher when the AlSi film was polished by CMP. Hence, the contrast between the AlSi film as reflection electrode and the Ti film as a shading layer was greatly improved.

Further, in the fifth embodiment, a holding capacity for image signal is formed by the shading metal layer 12, the pixel reflection layer 11 and the insulation layer 13. In this regard, the shading metal layer 12 should preferably be maintained at the same potential as the transparent common electrode 16. Further, by providing a Ti or TiN layer or the like above or below the shading metal layer, capacitance defect caused by e.g. hillock formation can be effectively prevented. If the insulation layer 12 is formed by using SiN, $Ta_2O_5$, SiON, etc. other than usual $SiO_2$, a large capacitance can be formed in a small area. By using those techniques as mentioned above, structures in further smaller pixel sizes can be produced to realize high precision and high contrast display.

EXAMPLE 1

A first example is an example that a projector is built using a reflection-type liquid crystal panel to which the above-described first embodiment is applied. Concrete structure of this example is shown in FIGS. 1A and 1B. First, preparing a p-type Si substrate, peripheral driving circuits are formed. Then, a field oxide film is formed by performing wet thermal oxidation at 100° C. for two hours. Next, TFTs are formed, each of which is isolated with an insulation layer such as BPSG (Boron Phosphine doped Silicate Glass). Ti and TiN are sputtered on the insulation layer as a shading metal layer 12. Furthermore, on the insulation layer 13, pixel reflection electrodes 11 are formed with p-SiN and p-SiO. Then, a device substrate incorporating TFTs and the like is completed. Next, an opposing substrate 15 having a common transparent electrode 16 is bonded to this device substrate, and TN liquid crystal is injected as a liquid crystal material 14 to complete the liquid crystal panel shown in FIGS. 1A and 1B.

Figure 6:
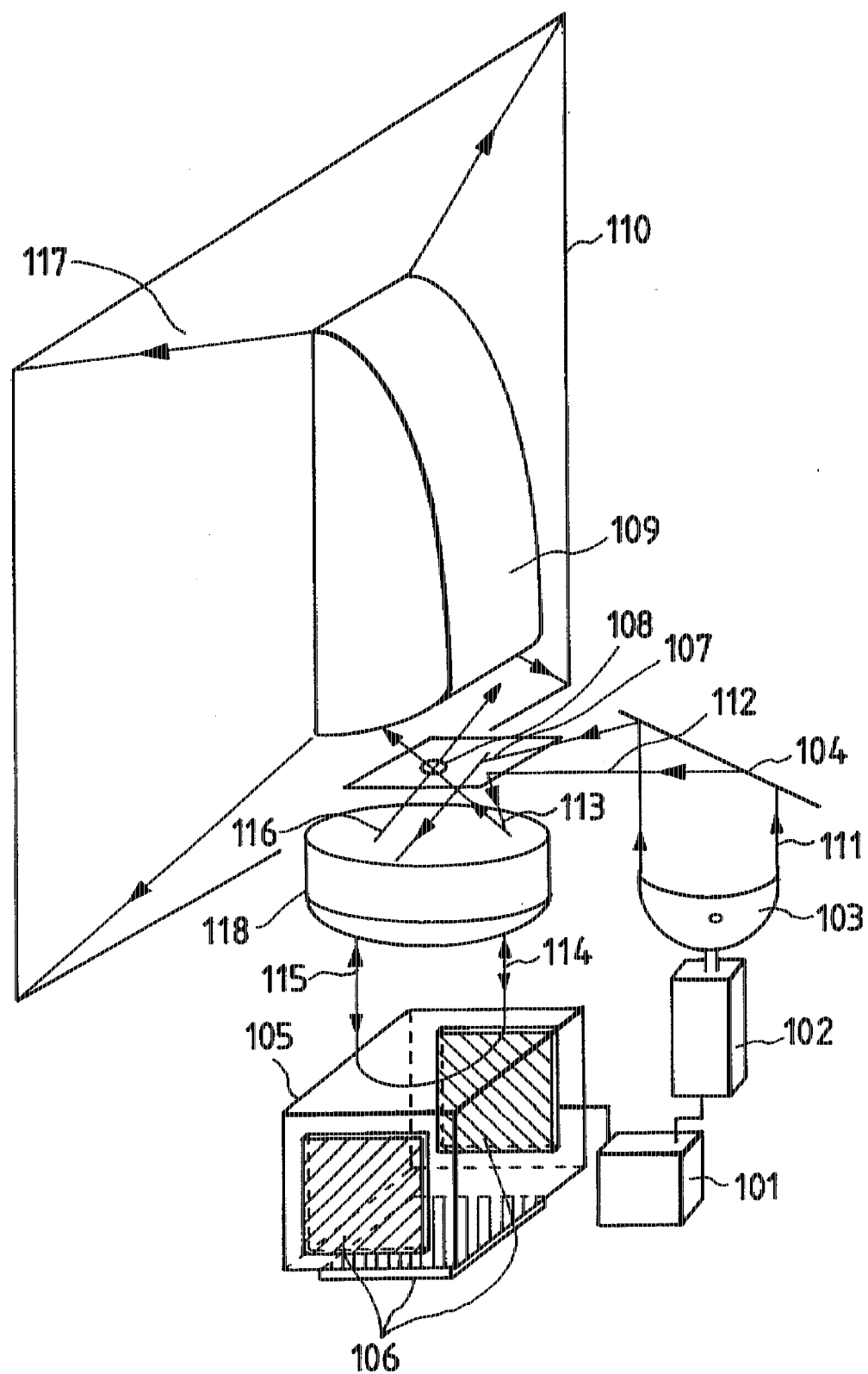
FIG. 6 is a drawing showing a projection display unit of a first example.

Subsequently, using the completed liquid crystal panel, a reflection-type optical system is built. FIG. 6 is a perspective view of the optical system. In this view, numeral 101 represents a panel driving and light source control board, 102 does an optical unit, 103 does a light source, 104 does an aspheric mirror, 105 does a color separation prism, 106 does the above-described liquid crystal panel, 107 does a micro mirror, 108 does an aperture, 109 does a free curvature prism optical system, 110 does a screen, and 118 does a telecentric system lens. Numerals 111 to 116 represent light.

The light beam 111 projected from the light source 103 is condensed by the aspherical mirror 104 and imaged on the micro mirror 107. Reflected light 113 from the micro mirror 107 is separated into red, green, and blue by the color separation prism 105, and enters into the liquid crystal panel 106 in a parallel ray. The liquid crystal panel 106 modulates the light, separated into red, green, and blue, according to a modulation signal. The modulated light 115 enters again to the lens 118, its dark display light only passes through the aperture 108, and the light enters into the free curvature prism 109. Owing to using this free curvature prism optical system, it becomes possible to form images being thinner than and having smaller aberration than conventional ones on the screen 110. Owing to this, rear-type and front-type projection display units could be built in high resolution, high brightness, low cost, small sizes, and high contrast.

EXAMPLE 2

A second example is an example that a projection display unit being the same as that in the first example is built using a reflection-type liquid crystal panel to which the above-described second embodiment is applied. Concrete structure of this example is shown in FIG. 3. First, an n-type Si substrate 1 is prepared, on which a p-type well 22 is built. Then, a gate oxide film and a field oxide film 2 are formed with the LOCOS method, and polysilicon for gate electrodes is coated. Next, with patterning, gate electrodes 5 and 8 are built. After that, by injecting B ions, sources 3 and 6, and drains 4 and 7 are formed to build MOSFETs for peripheral driving circuits and pixels. Each of them is isolated with insulation layer of PSG, p-$SiO_2$, and p-SiN. Then, wiring layers 9 and 10 are built, on which an insulation layer of p-SiO/$O_3$-TEOS/p-SiO is deposited, and on the insulation layer Ti, TiN, and W are formed as a shading metal layer. After deposition of the insulation layer, pixel reflection electrodes 12 are formed. Then, a device substrate is completed. Processing after this is the same as that in the first example.

What is claimed is:

1. A display unit comprising a first substrate having a display area including a plurality of reflection electrodes with a gap portion formed therebetween and a peripheral portion around the display area, a second substrate opposing said first substrate and having a transparent electrode, and a liquid crystal material being put between said first and second substrates, wherein said first substrate has a shading layer at at least part of said gap portion and said peripheral portion, and wherein said shading layer exhibits a different reflection characteristic from said reflection electrodes.

2. The display unit according to claim 1, wherein said first substrate has an insulation layer between said reflection electrodes and said shading layer to form a holding capacitor.

3. The display unit according to claim 1, wherein said shading layer is composed of a different material from said reflection electrodes to exhibit the different reflection characteristic.

4. The display unit according to claim 3, wherein said reflection electrodes are composed primarily of Al and said shading layer is composed primarily of a material selected from Ti, TiN, W and Mo.

5. The display unit according to claim 1, wherein said shading layer has a different surface roughness from said reflection electrodes to exhibit the different reflection characteristic.

6. The display unit according to claim 1, wherein said shading layer reflects light to a different direction from said reflection electrodes to exhibit the different reflection characteristic.

7. The display unit according to claim 6, wherein said shading layer has a different surface angle from said reflection electrode.

8. The display unit according to claim 7, wherein, let the angle between the surfaces of said reflection electrodes and the surface of said shading layer be θ, let the refractive index of said liquid crystal material be n, and let the F-number of an optical projection system be F, and θ satisfies any of the followings:

$$\frac{\tan^{-1}\left(\frac{1}{2F}\right)}{n} < \theta < 45° - \frac{\tan^{-1}\left(\frac{1}{2F}\right)}{2n}$$

$$45° + \frac{\tan^{-1}\left(\frac{1}{2F}\right)}{2n} < \theta < 60° - \frac{\tan^{-1}\left(\frac{1}{2F}\right)}{3n}$$

$$60° + \frac{\tan^{-1}\left(\frac{1}{2F}\right)}{3n} < \theta < 67.5° - \frac{\tan^{-1}\left(\frac{1}{2F}\right)}{4n}$$

$$67.5° + \frac{\tan^{-1}\left(\frac{1}{2F}\right)}{4n} < \theta < 72° - \frac{\tan^{-1}\left(\frac{1}{2F}\right)}{5n}$$

$$72° + \frac{\tan^{-1}\left(\frac{1}{2F}\right)}{5n} < \theta < 90°.$$

9. The display unit according to claim 8, wherein said θ is 10° to 30°.

10. The display unit according to claim 6, wherein said first substrate has a thick insulation layer under said reflection electrodes and a thin insulation layer at the gap portion.

11. The display unit according to claim 6, wherein said first substrate has a signal line in a plane below said reflection electrodes and a plurality of wiring layers with a gap space formed therebetween in the same plane as the signal line, and wherein said gap space is wider under said gap portion than under said reflection electrodes.

12. The display unit according to claim 6, wherein edges of said reflection electrodes adjoining each other are asymmetric to the pixel boundary plane therebetween.

13. The display unit according to claim 6, wherein said transparent electrode has a different angle from said reflection electrodes.

14. The display unit according to claim 6, wherein said first substrate has a plurality of scanning lines, a plurality of signal lines intersecting with said scanning lines, and a plurality of pixel switches located in the intersections of said scanning lines and said signal lines.

* * * * *

UNITED STATES PATENT AND TRADEMARK OFFICE
CERTIFICATE OF CORRECTION

PATENT NO. : 5,708,486

DATED : January 13, 1998

INVENTOR(S) : MAMORU MIYAWAKI, ET AL.

It is certified that error appears in the above-identified patent and that said Letters Patent is hereby corrected as shown below:

On title page,

AT [56] REFERENCES CITED

FOREIGN PATENT DOCUMENTS

```
" 03142417 "    should read    -- 3-142417 --.
  07120744                        7-120744
  07281207                        7-281207
```

COLUMN 1

Line 21, "types. Because" should read
--types because--; and
Line 36, "enter to" should read --enter into--.

COLUMN 2

Line 45, "differenciating" should read --differentiating--.

COLUMN 5

Line 1, "In" should read --At--;
Line 13, "In" should read --At--; and
Line 16, "effect" should read --the effect--.

COLUMN 6

Line 48, "In" should read --At--; and
Line 63, "In" should read --At--.

UNITED STATES PATENT AND TRADEMARK OFFICE
CERTIFICATE OF CORRECTION

PATENT NO. : 5,708,486

DATED : January 13, 1998

INVENTOR(S) : MAMORU MIYAWAKI, ET AL.

It is certified that error appears in the above-identified patent and that said Letters Patent is hereby corrected as shown below:

COLUMN 7

Line 9, "More over," should read --Moreover,--;
 Line 10, "In" should read --At--;
 Line 23, "In" should read --At--; and
 Line 35, "followings" should read --following--.

COLUMN 8

Line 13, delete ", the wiring" and
   delete "as usual wiring";
 Line 14, "realizes" should read --is employed to realize--;
 Line 40, "angles" should read --the angles--; and
 Line 55, "In" should read --At--.

COLUMN 9

Line 49, "In" should read --At--; and
 Line 55, "In" should read --At--.

COLUMN 10

Line 15, "enters to" should read --enters into--; and
 Line 25, "positional" should read --the positional--.

COLUMN 11

Line 62, "to" should read --into--.

UNITED STATES PATENT AND TRADEMARK OFFICE
CERTIFICATE OF CORRECTION

PATENT NO. : 5,708,486

DATED : January 13, 1998

INVENTOR(S) : MAMORU MIYAWAKI, ET AL.

It is certified that error appears in the above-identified patent and that said Letters Patent is hereby corrected as shown below:

COLUMN 12

Line 10, "Concrete" should read --A concrete--; and
　　Line 67, "followings:" should read --following:--.

Signed and Sealed this

Sixth Day of October, 1998

Attest:

BRUCE LEHMAN

Attesting Officer　　　Commissioner of Patents and Trademarks